US 12,551,812 B2

(12) United States Patent
Owen et al.

(10) Patent No.: US 12,551,812 B2
(45) Date of Patent: Feb. 17, 2026

(54) AIR DRIVEN TOY

(71) Applicants: Bradley H. Owen, Chagrin Falls, OH (US); Martin Alpert, Beachwood, OH (US)

(72) Inventors: Bradley H. Owen, Chagrin Falls, OH (US); Martin Alpert, Beachwood, OH (US)

( * ) Notice: Subject to any disclaimer, the term of this patent is extended or adjusted under 35 U.S.C. 154(b) by 243 days.

(21) Appl. No.: 17/507,522

(22) Filed: Oct. 21, 2021

(65) Prior Publication Data

US 2022/0126217 A1    Apr. 28, 2022

Related U.S. Application Data

(60) Provisional application No. 63/104,539, filed on Oct. 23, 2020.

(51) Int. Cl.
  *A63H 33/04*    (2006.01)
  *A63H 30/04*    (2006.01)
  *A63H 33/06*    (2006.01)

(52) U.S. Cl.
  CPC ........... *A63H 33/042* (2013.01); *A63H 30/04* (2013.01); *A63H 33/06* (2013.01)

(58) Field of Classification Search
  CPC .. A63H 33/042; A63H 18/002; A63H 18/021; A63H 30/06; G09B 19/0069; G09B 23/06; G09B 23/12; G09B 25/025
  USPC .......... 446/89, 178, 179; 434/126, 283, 300, 434/302
  See application file for complete search history.

(56) References Cited

U.S. PATENT DOCUMENTS

| | | | | |
|---|---|---|---|---|
| 1,033,094 A * | 7/1912 | Fuda | ....................... | F41B 11/66 124/64 |
| 2,630,320 A * | 3/1953 | Francis | ..................... | A63F 9/14 463/64 |
| 2,890,537 A * | 6/1959 | Benko | .................... | A63H 33/40 434/140 |
| 2,993,297 A * | 7/1961 | Bednar | ................ | A63H 27/005 124/64 |
| 3,112,109 A * | 11/1963 | Young | ....................... | A63F 9/02 273/400 |
| 3,673,705 A * | 7/1972 | Wright | ................... | G09B 23/12 434/126 |
| 3,697,071 A * | 10/1972 | Anderson | ............ | A63H 18/002 446/178 |
| 3,711,038 A * | 1/1973 | Van Otteren | .......... | B65G 51/04 406/84 |
| 3,739,764 A * | 6/1973 | Allport | ................... | A63H 27/14 446/225 |
| 4,076,006 A * | 2/1978 | Breslow | .................. | F41B 11/89 446/212 |
| 4,080,752 A * | 3/1978 | Burge | .................. | A63H 33/042 285/179 |
| 4,159,705 A * | 7/1979 | Jacoby | .................... | F41B 11/66 124/63 |
| 4,162,106 A * | 7/1979 | Lawrence | ............ | A63H 18/002 406/185 |

(Continued)

*Primary Examiner* — Joseph B Baldori
(74) *Attorney, Agent, or Firm* — SherWin Legal LLC (57) ABSTRACT

An air driven toy includes at least one connectible section that is removably couplable to an air flow generator to receive the object and defines at least one path for fluid flow through the at least one connectible section, wherein the air flow generator is configured to cause the object to be propelled through the at least one connectible section.

20 Claims, 4 Drawing Sheets

(56) References Cited

U.S. PATENT DOCUMENTS

| | | | |
|---|---|---|---|
| 4,223,472 A * | 9/1980 | Fekete | A63H 27/14 |
| | | | 74/543 |
| 4,229,005 A * | 10/1980 | Barlow | A63H 18/002 |
| | | | 463/64 |
| 4,250,657 A * | 2/1981 | Barlow | A63F 9/0079 |
| | | | 446/178 |
| 4,458,602 A * | 7/1984 | Vandersteel | B65G 51/04 |
| | | | 104/168 |
| 4,619,625 A * | 10/1986 | Seki | A63H 29/16 |
| | | | 446/89 |
| 4,725,256 A | 2/1988 | Sassak | |
| 5,385,472 A * | 1/1995 | Mullin | G09B 23/12 |
| | | | 446/166 |
| 5,471,968 A * | 12/1995 | Lee | F41B 11/89 |
| | | | 124/64 |
| 5,522,756 A * | 6/1996 | Barthold | A63H 5/00 |
| | | | 446/193 |
| 5,577,945 A * | 11/1996 | LaBelle | A63H 33/00 |
| | | | 446/166 |
| 5,680,032 A * | 10/1997 | Pena | F03D 9/12 |
| | | | 290/55 |
| 6,499,409 B1 | 12/2002 | Niederer et al. | |
| 6,672,930 B1 | 1/2004 | McElhaney | |
| 6,722,887 B2 | 4/2004 | Polonio | |
| 6,729,808 B1 | 5/2004 | Nelson | |
| 6,926,579 B2 * | 8/2005 | Rappaport | F41B 11/66 |
| | | | 446/212 |
| 7,160,171 B1 * | 1/2007 | Rehkemper | F01B 17/02 |
| | | | 273/108 |
| 7,544,017 B2 | 6/2009 | Keagy | |
| 7,874,892 B2 * | 1/2011 | Hippely | A63H 29/16 |
| | | | 446/64 |
| 7,987,841 B2 * | 8/2011 | Bernstein | A63H 27/14 |
| | | | 124/64 |
| 8,177,120 B2 * | 5/2012 | Wickart | G07F 7/04 |
| | | | 232/1 D |
| 8,757,331 B2 * | 6/2014 | Laxhuber | B60T 1/16 |
| | | | 290/40 C |
| 9,273,633 B2 * | 3/2016 | Spangler | G09B 23/12 |
| 9,309,063 B2 * | 4/2016 | Soerensen | B65G 51/02 |
| 9,352,914 B2 * | 5/2016 | Le | B65G 51/32 |
| 9,694,992 B2 | 7/2017 | Gross et al. | |
| 2008/0098631 A1 | 5/2008 | Keagy | |
| 2011/0293380 A1 | 12/2011 | Stuke et al. | |
| 2018/0085679 A1 * | 3/2018 | Welch | A63H 29/14 |
| 2023/0201734 A1 * | 6/2023 | Landi, Jr. | A63H 27/14 |
| | | | 123/674 |

* cited by examiner

AIR DRIVEN TOY

RELATED APPLICATIONS

This application claims the benefit of U.S. Provisional Application No. 63/104,539 filed Oct. 23, 2020, which is hereby incorporated herein by reference in its entirety.

TECHNICAL FIELD

The present disclosure relates generally to toy building sets and more specifically to a set of modular connectible sections removably coupled to an air flow generator configured to receive an object and cause the object to be propelled through the connectible sections.

BACKGROUND

Children's toys may be configured to move objects to generate motion, light, sound, and the like to entertain and educate a user of objects associated with the toy. Existing methods and systems are complex in that the system requires a complex pneumatic source that may be separate. Still another disadvantage of prior methods and systems to provide a toy having a movable object is that the object may become lodged at some location along the path of travel for the object.

SUMMARY

The present disclosure provides an air driven toy building set with a fluid flow generator and an assembly of modular connectible sections configured to propel an object through the connectible sections.

According to an aspect of the disclosure, an air driven toy includes an air flow generator configured to provide a flow of fluid, receive an object, and project the object out of the air flow generator via the flow of fluid.

According to an aspect of the disclosure, an air driven toy includes at least one connectible section that is removably couplable to an air flow generator to receive the object and defines at least one path for fluid flow through the at least one connectible section, wherein the air flow generator is configured to cause the object to be propelled through the at least one connectible section.

According to another aspect of the disclosure, a method for operating an air driven toy includes generating a flow of fluid in an air flow generator, inserting an object in the air flow generator, coupling at least one connectible section to the air flow generator, wherein the at least one connectible section defines at least one path for fluid flow through the at least one connectible section, and propelling the object through the at least one connectible section via the air flow generator generating the flow of fluid.

While a number of features are described herein with respect to embodiments of the disclosure; features described with respect to a given embodiment also may be employed in connection with other embodiments. The following description and the annexed drawings set forth certain illustrative embodiments of the disclosure. These embodiments are indicative, however, of but a few of the various ways in which the principles of the disclosure may be employed. Other objects, advantages and novel features according to aspects of the disclosure will become apparent from the following detailed description when considered in conjunction with the drawings.

BRIEF DESCRIPTION OF THE DRAWINGS

The annexed drawings, which are not necessarily to scale, show various aspects of the disclosure in which similar reference numerals are used to indicate the same or similar parts in the various views.

DETAILED DESCRIPTION

The present disclosure is now described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

The present disclosure provides an air driven toy building set with an air flow generator and a plurality of connectible sections that, when assembled, may be configured to propel an object through the connectible sections via the air flow generator generating air flow. Accordingly, the path of travel for the object may be the same path as the air flow path. The air flow generator may include any suitable device for generating air flow. The air driven toy building set preferably includes one or more connectible sections coupled to the air flow generator. The connectible sections are configured to have complementary mating connectors such that connectible sections may be easily coupled and decoupled to each other and to the air flow generator. For example, the coupling may be able to be performed by a small child without a high exertion of force.

Figure 1:
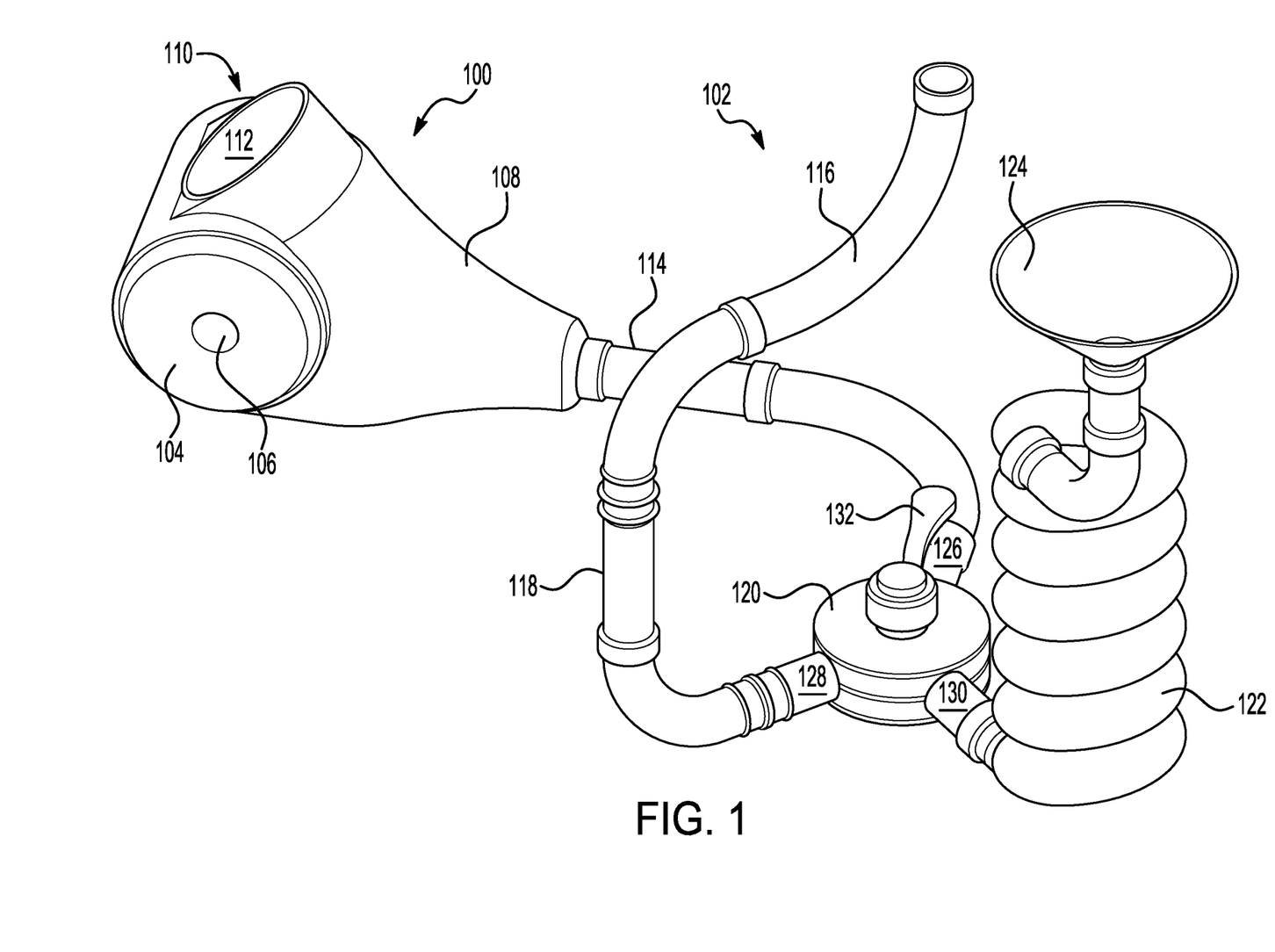
FIG. 1 shows an air driven toy building set according to an exemplary embodiment of the disclosure.

Turning to FIG. 1, an exemplary air driven toy building set is shown. The air driven toy building set includes an air flow generator 100 and a plurality of connectible sections 102. Any number of connectible sections 102 may be provided and the connectible sections 102 may have any suitable shape. The connectible sections 102 may be configured to perform a desired function for a children's toy, such as output a sound or visual indicator.

The air flow generator 100 is configured to receive an object and propel the object through the connectible sections 102 via the generation of air flow through the same connectible sections 102. The object may be any suitable propellable object, such as a ball, a sheet of material or clothing item, a toy car, flying toy, other small toys, or a food item, such as pieces of candy. In still other exemplary embodiments, the object may be electronic. For example, the object may be configured to flash lights and/or play music as the object moves.

In exemplary embodiments, magnets may be arranged within the connectible sections 102 to demonstrate scientific principles or perform a function for the corresponding connectible section 102. In an exemplary embodiment, a loop of wire may be arranged in the connectible sections 102 and the object may include a magnet, such that when the object travels through the loop of wire, a current is generated and lights a light, such as an LED while crossing the loop of wire.

The air driven toy may be configured to propel the same types of toys or different toys. The air driven toy may also be configured to launch the toy. The air flow and the object may share the same path of travel through the air driven toy. In other exemplary embodiments, the air flow and the object may have separated paths through a same connectible section. For example, airflow may travel through one path and the object may travel through another path via the momentum the object had when airflow is no longer provided for moving the object. Only a portion of the toy may not have airflow.

The air flow generator 100 may be configured to be self-supporting and rest on a ground surface. In other exemplary embodiments, the air flow generator 100 may be handheld. The air flow generator 100 includes any suitable device 104 configured to create a continuous fluid flow, a flow that is pulsed with a variable frequency, or a flow having any trajectory through the plurality of connectible sections 102. In an exemplary embodiment, the air flow generator 100 may be arranged at a most upstream end of the air driven toy. In other exemplary embodiments, more than one air flow generator may be provided along the air driven toy, such as to provide a boost of air along the path of travel.

The device 104 may include at least one centrifugal fan or turbine consisting of a rotating arrangement of vanes and/or blades configured to act on a fluid such as air to create a fluid flow. More than one fan may be provided. In an exemplary embodiment, the device 104 may include a centrifugal fan for moving air from an inlet duct 106 in the air flow generator 100. A drive mechanism and an impeller for the device 104 may be disposed within a housing 108 for the air flow generator 100. The device 104 may include a suction device or vacuum. A house vacuum may be used. In still other exemplary embodiments, the device 104 may include a pump, compressor, bellows, piston, venturi nozzle, other pneumatic tools, etc. The pump may be automated or manually operated. Any additional devices air flow generation devices may be used at any point along the path of travel for the air flow and/or object.

The device 104 may be powered with external power such as AC power, DC power from a USB device, or any suitable power source. The device 104 may include a portable power supply such as a battery that may be integrated, rechargeable, and/or replaceable. The device 104 may be automated and/or remotely controlled. In other exemplary embodiments, the device 104 may be manually operated. An amount of air flow and/or the speed of the object may be varied automatically or manually by adjusting an amount of air flow generated, such as for entertainment or learning purposes. The airflow may also be controlled within or through the connectible sections 102. For example, the device 104 may include an air flow controller to control the cubic feet per minute or baffle of a fan.

The air flow generator 100 may include a microprocessor and additional circuitry along with software stored on a memory to facilitate connection of the air flow generator 100 with a remote computing device such as a mobile device, tablet, laptop, and the like. The circuitry may include wired and/or wireless connections. The software may also be configured to store preset modes of operation or sequences for the air driven toy. A user may select a specific path of travel for the object through the connectible sections 102 or a random path of travel. For example, the connectible sections 102 may include caps, paddles, flap doors, triggers or other closure mechanisms to close or open the paths for the flow of air and/or object. The functions may be preset or electronically activated and changed while the object is in the tube by wired and/or wireless communication. The software may be configured to store algorithms for games or specific functions to be performed by the air driven toy, such as outputting a song or visual identifier.

The air flow generator 100 may also include a housing 108 that has an aperture 110 for receiving objects to be propelled through the air driven toy set. The insertion of the object may be independent from the device 104, e.g. independent from a pump or other air flow generation device. For example, the air flow generator 100 may be arranged at an upstream or downstream location relative to where the object is inserted into the air driven toy. Any of the connectible sections 102 may include an aperture for receiving an object. One or more objects may be inserted in the aperture 110 of the device 104. For example, multiple objects could be passing through the assembled device at one time. The aperture 110 may include a flap door that is released manually or automatically to open the flow path to release and/or suck the objects into the air driven toy. The flap door may also block lost airflow from the entry point when objects are not being introduced into the air driven toy. The device 104 may further include a chamber for holding the objects prior to entrance into the path of travel.

The air flow generator 100 may include an object insertion section 112 extending from the aperture 110 into the air flow generator 100. The object insertion section 112 may have any suitable shape. For example, the object insertion section 112 may have a conical shape to facilitate receiving objects and positioning the objects to be propelled through the system. The housing 108 may have a connector extension 114 configured to couple the housing 108 to the plurality of connectible sections 102. The connector extension 114 may be removably connected to the housing 108.

The plurality of connectible sections 102 may be configured to be coupled to each other and to the air flow generator 100, such that any of the connectible sections may be coupled directly to the air flow generator 100. The connectible sections 102 may be configured to rest on a ground, extend vertically, or be supported above a ground surface, e.g. the air driven device may be built up. In order to reduce the probability of objects being lodged in the connectible sections 102, the diameter of the connectible sections 102 may be constant or variable along an entire length from a first end to a second end. The diameter or inner perimeter of the connectible sections 102 may correspond to the diameter or size of the objects that are configured to travel through the air driven toy. In exemplary embodiments, the length may be a multiple of the diameter of the object, such as 2:1 or 3:1. The lengths and modularity of the connectible sections 102 enables easy assembly and removal of the connectible sections 102.

The plurality of connectible sections 102 may be tubular and the connectible sections 102 may have the same or different shapes. The connectible sections 102 may be configured to have horizontal and/or vertical orientations. In exemplary embodiments, the connectible sections 102 may have the same or different diameters. The shapes may include elbow sections 116 or straight sections 118 that define linear flow paths. The straight sections may have the same or different lengths. The shapes may be curved or serpentine such that the connectible sections 102 define non-linear flow paths. Multifunction sections 120 may be provided that include more than one inlet and/or outlet.

The connectible sections may include a spiral section 122 or a conical section 124. The spiral section 122 may have a number of spirals. The spiral section 122 may be configured to have a vertical and/or horizontal orientation. In an exemplary embodiment, the conical section 124 may be configured to receive the object separately from the air flow generator 100. The shapes of the connectible sections 102 may include worm-shaped, U-shaped, X-shaped, or T-shaped sections. Splitters, redirectors, funnels, and midway entry points may also be provided. Many different shapes are possible.

The connectible sections 102 may have shapes other than tubular or cylindrical. For example, the connectible sections 102 may be rectangular or have some other shape, with flow paths defined within the structure. The connectible sections 102 may be collapsible or expandable, such as to enable storage and/or change configuration before or during operation. The expanded sections may be used to change the angle of travel of the object and/or gradually change the angle of travel of the object. In another example, a rotatable or tumbler ball defining an open cavity in which the object is received may be used. The tumbler ball may be filled with items other than the object. A connectible section 102 may run through a tumbler or exterior ball or exterior tube, such that an enclosed space is defined between an exterior of the connectible section 102 and an outer housing.

The connectible section 102 may include holes or perforations added to the connectible section. Air may be trapped between the connectible section 102 and the exterior tube or tumbler ball, such that an action may take place within the area defined between the connectible section 102 and the exterior tube or tumbler ball. For example, objects may be blown around outside of the connectible section 102, within the exterior tube or tumbler ball, for entertainment or learning purposes.

The connectible sections 102 may be configured for launching objects. In still another example, launch and land pads or devices may be provided in the connectible sections that enable an object, such as a ball to jump from one connectible section to the other. Ball stacking chambers, floating/hovering attachments, and balloons or other inflatables may also be used.

The air driven toy may be configured to move an object from one point to another, or from one device to another device. One of the connectible sections may be configured to launch the object out of the air driven toy and may include additional components for launching, such as a paddle or spring that is activated by the moving flow of air and/or object, and/or a target or receptacle for catching the launched object. In other exemplary embodiments, the connectible sections 102 may connect back to the device 104, such that the air driven toy is a closed loop device, rather than an open loop device such as for a launcher.

The multifunction section 120 may include a valve and/or selector function. For example, the multifunction section 120 may include a first opening 126, a second opening 128, a third opening 130, and a selector handle 132. Any number of openings may be provided. The selector handle 132 may be configured to direct objects and/or fluid flow from the first opening 126 to the second opening 128, from the first opening 126 to the third opening 130, and/or block fluid flow from passing from the first opening 126 to the second 128 and/or third opening 130. In other exemplary embodiments, one or more caps may be provided to close at least one of the openings. The multifunction section 120 may be disc-shaped, or have any other shape. For example, the multifunction section 120 may be rectangular in shape with multiple flow passages.

In exemplary embodiments, the multifunction section 120, or any of the other connectible sections, may also include one or more elements that emit light, another visual indicator, and/or sound in response to the object and/or air driven in the toy set. For example, lights such a LEDs may be used. Lights may also be implemented within the object. Regarding sound, musical attachments may be powered by the airflow, such as wind instruments, e.g. flute, saxophone, whistle, horn, trumpet, organ, etc. Other electronics may also be powered by the airflow. The instrument or electronics may be controlled manually or automatically, and by any suitable device, such as a knob, digital button, or by hand. The automatic control includes electronic control which includes wired and wireless communication.

A display for outputting an image or data may be connected to the toy such that as the air and/or object passes through a connectible section, a certain image corresponding to the connectible section is displayed. The image may provide information about the system and about the object, such as the velocity of the object. Engageable buttons, switches, or other activatable device may be arranged to be activated by the moving object. A user interface may also be connected to the toy and configured to receive a user input. For example, the user interface may be communicatively coupled to the selector handle to move the selector handle 132 to a desired position. One of ordinary skill in the art would recognize many variations, modifications, and alternatives.

In still another exemplary embodiment, one or more of the connectible sections 102 may include a camera configured to view the object in transit and/or capture images of the object. The camera may be used to view the relationship between the system configuration and the object movement.

The air flow generator 100 and/or the plurality of connectible sections 102 may be powered with external power such as AC power, DC power from a USB device, and the like. The air flow generator 100 may be manually operable without electrical power in other embodiments. The air flow generator 100 and/or the plurality of connectible sections 102 may include a portable power supply such as a battery that may be integrated, rechargeable, and/or replaceable. A generator may be provided. In exemplary embodiments, the battery may be charged via air flow or solar power. Circuitry may be provided to transfer energy from the fluid flow to the rechargeable battery configured to power electronics associated with at least one connectible section 102. In other exemplary embodiments, circuitry may be provided to transfer solar energy to the rechargeable battery configured to power electronics associated with at least one connectible section 102.

The air flow generator 100 and/or the plurality of connectible sections 102 may include a microprocessor and additional circuitry along with software stored on a memory to facilitate connection of the air flow generator 100 with a remote computing device such as a mobile device, tablet, laptop, and the like. The software may be used to induce a child to learn programming skills. In an exemplary embodiment, the air driven toy apparatus may be controlled by the remote computing device. In still other exemplary embodiments, a user may control the air driven toy via an application for a mobile device.

Figures 2, 3A, 3B, 3C:
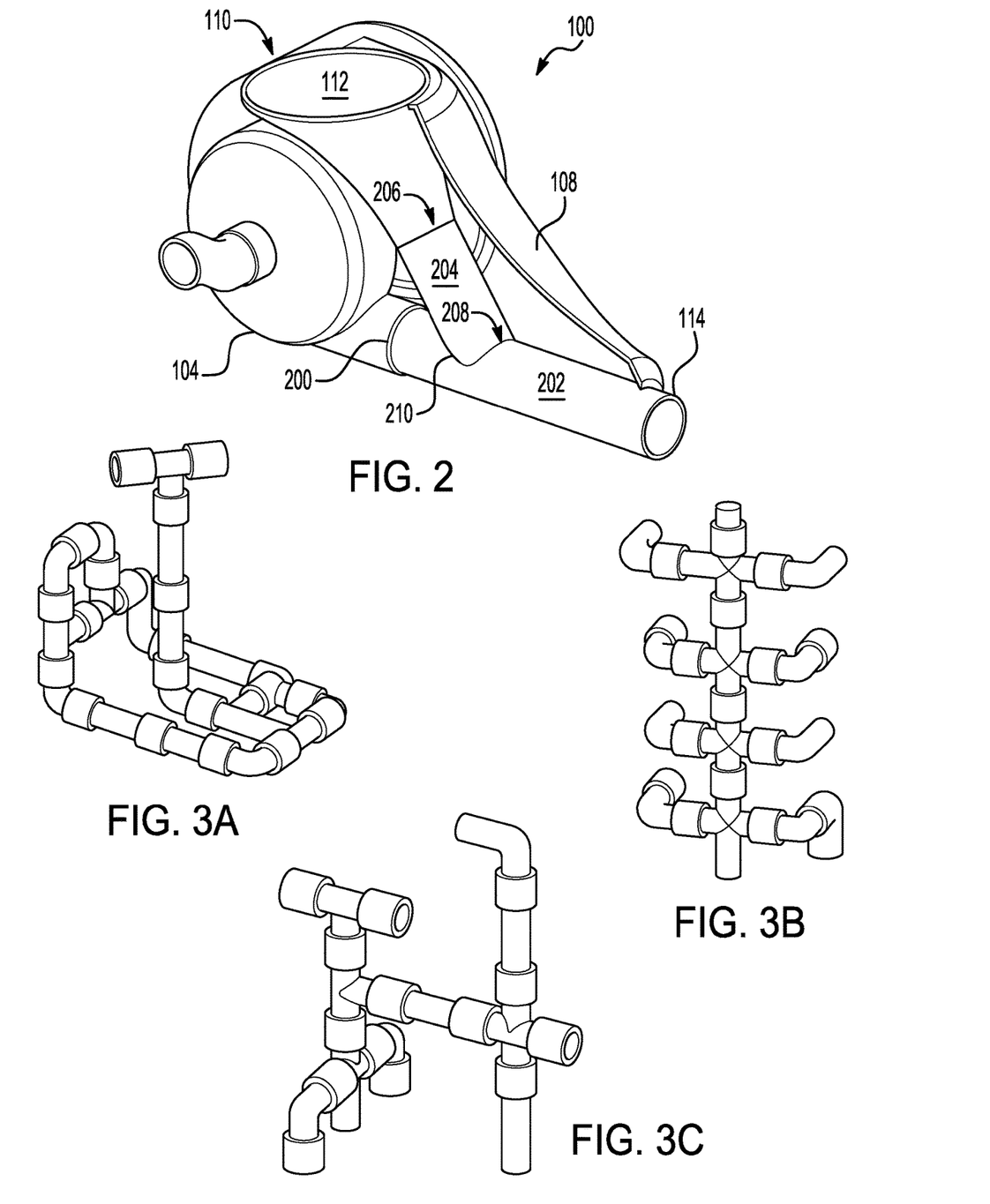
FIG. 2 is a sectional view of an exemplary air flow generator of the air driven toy building set shown in FIG. 1.
FIG. 3A shows an exemplary embodiment of assembled connectible sections for the air driven toy building set of FIG. 1.
FIG. 3B shows another exemplary embodiment of assembled connectible sections for the air driven toy building set of FIG. 1.
FIG. 3C shows still another exemplary embodiment of assembled connectible sections for the air driven toy building set of FIG. 1.

FIG. 2 is a sectional view of an exemplary air flow generator. The cut-away view shows the internal tube structure of the air flow generator 100. In the exemplary embodiment, the device 104 is a centrifugal fan. An outlet 200 of the centrifugal fan is coupled to a main tube section 202. The main tube section 202 is configured to extend from the outlet 200 of the centrifugal fan to the housing 108 of the air flow generator 100. The main tube section 202 may extend from the body to form the connector extension 114 and/or an additional tube section may be coupled to the main tube section 202 to form the connector extension 114.

The object insertion section 112 is shown extending from the aperture 110 to a branch tube 204. A first end 206 of a branch tube is coupled to the object insertion section 112 and a second end 208 is coupled to the main tube section 202 to form a wye junction. The wye junction reduces the force necessary to propel the object once the object is positioned in the main tube section 202. The angle of the wye junction may be selected to form an optimally sized opening 210 on the main tube section 202.

In other exemplary embodiments, more than one air flow generator may be provided. For example, air flow generators may be arranged at opposite ends of the connected connectible sections. Positive and/or negative flow vacuums may be implemented. For example, house vacuums may be used. The system may be arranged to have a flow of air in a circle. The system may be configured to be a closed loop system.

FIGS. 3A, 3B, and 3C show various configurations of assembled connectible sections. The connectible sections 102 may include an adapter to connect tubular sections of different sizes, an elbow to allow a change of direction, a coupler to connect tubular sections, a reducer to decrease the diameter of the tube and increase/decrease the fluid flow depending on the direction of fluid flow, or an expander to increase the diameter of the tube and decrease the flow, a tee to combine or divide fluid flow, multi-way tubular sections with multiple inlet/outlets such as a cross, a cap section configured to permit fluid flow but to stop the object, a valve section, and the like. The air driven toy building set may be configured to function with one or more objects of a predetermined diameter or range of diameters. The diameter of a reducer tubular section is limited by the diameter of the object the user intends to use.

The connectible sections 102 may be connected by any suitable connector. The connectors may be formed integrally as a unitary part of the connectible sections 102. In other exemplary embodiments, the connectors may be formed separately and connected to the connectible sections 102. The connectible sections 102 may each include complementary engaging mating surfaces that enable easy coupling and decoupling for changing the structure of the air driven toy. For example, the connectible sections may include sliders, threads, bayonet connectors, male/female couplers, tongue and grooves, ball and sockets, press-fits, snap-fits, clamps, magnets, and the like. Many other connections may be suitable. One of ordinary skill in the art would recognize many variations, modifications, and alternatives. The connectible sections 102 are arranged so that a child is able to change the configuration.

The connectible sections 102, the air flow generator 100, and the object, may be formed of any suitable materials and may be formed of any suitable manufacturing process. For example, the connectible sections may be formed of plastic material, rubber, or composite materials and formed by injection molding processes, additive manufacturing processes, or combinations thereof. The connectible sections may be formed of a flexible material. In other exemplary embodiments, the connectible sections may be formed of a rigid material. Metal or other materials may also be suitable. The object may be formed of a lightweight material to enable propulsion. In exemplary embodiments, the interior of the connectible sections may be formed to have an interior surface that provides friction, such as via a sandpaper or similar material formed on the interior. Many other materials and manufacturing methods may be possible.

Figures 4, 5, 6:
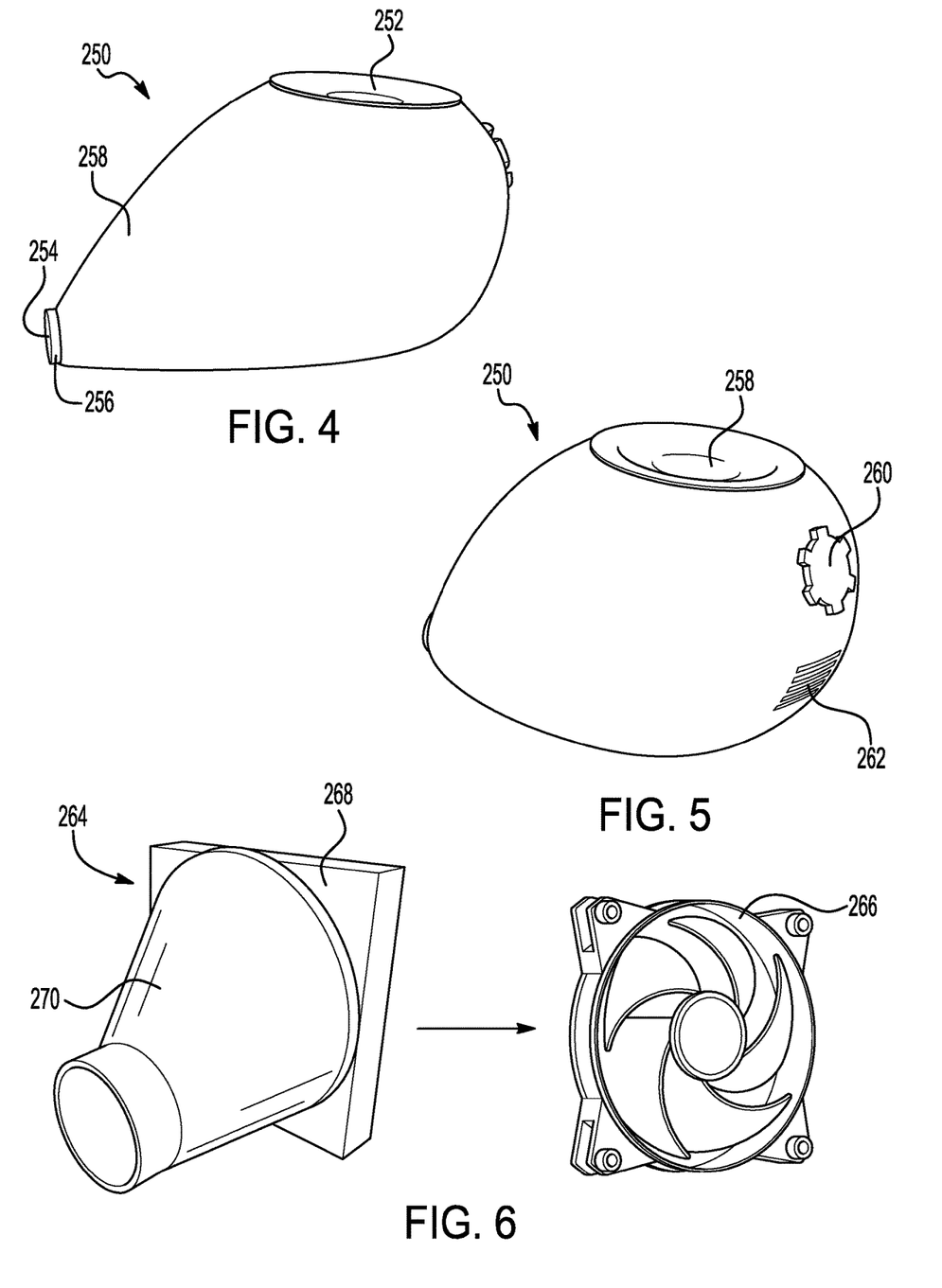
FIG. 4 shows another exemplary embodiment of an air flow generator for the air driven toy building set of FIG. 1.
FIG. 5 shows a rear side of the air flow generator of FIG. 4.
FIG. 6 shows a static pressure fan of an air flow generator for the air driven toy building set of FIG. 1.

FIGS. 4 and 5 show another exemplary embodiment of an airflow generator 250. The airflow generator 250 is configured to rest on a surface or be handheld. An inlet 252 is sized to receive an object. The inlet 252 may be circular in shape, or have any other suitable shape. The inlet 252 may be arranged at a top portion of the airflow generator 250. In other exemplary embodiments, the inlet 252 may be arranged along a side. An outlet 254 may be arranged at a bottom portion of the airflow generator 250. In exemplary embodiments, the outlet 254 may be arranged at an angle relative to the inlet 252, such as approximately 90 degrees. The angle may be less than or greater than 90 degrees. The angle may between zero and 90 degrees. The inlet 252 may be arranged to enable the object to enter inside the airflow generator 250 via gravity and/or via suction generated in the airflow generator 250. The outlet 254 may include a connector lip 256 that is configured to engage a connectible section. The connector lip 256 may include a seal. All of the connectible sections may include seals that prevent or minimize air leaks.

The airflow generator 250 may have a housing 258 in which a fan or other airflow generation device is arranged. The housing 258 may be enclosed, such that the housing 258 completely encloses the airflow generation device. An intake portion 260 is provided for drawing air into the airflow generation device from outside the housing 258. A vent 262 may also be provided. The intake portion 260 and vent 262 may be arranged opposite to the outlet 254.

FIG. 6 shows an exemplary high static pressure fan assembly 264 configured to be arranged in the airflow generator and including high static pressure fan 266. The high static pressure fan 266 is arranged in an enclosure 268 which is connected to an intake portion 270. The high static pressure fan 266 may be configured to generate suction in the housing and draw the object into a passage, and provide a flow of fluid to the passage so that the object is projected through the outlet via the flow of fluid. Using a high static pressure fan may be advantageous as compared with other fans in that the fan may use a small volume and the fan blades create static pressure to eliminate or reduce air flowing backwards of the fan. This ensures that the objects are pushed forcefully.

Figure 7:
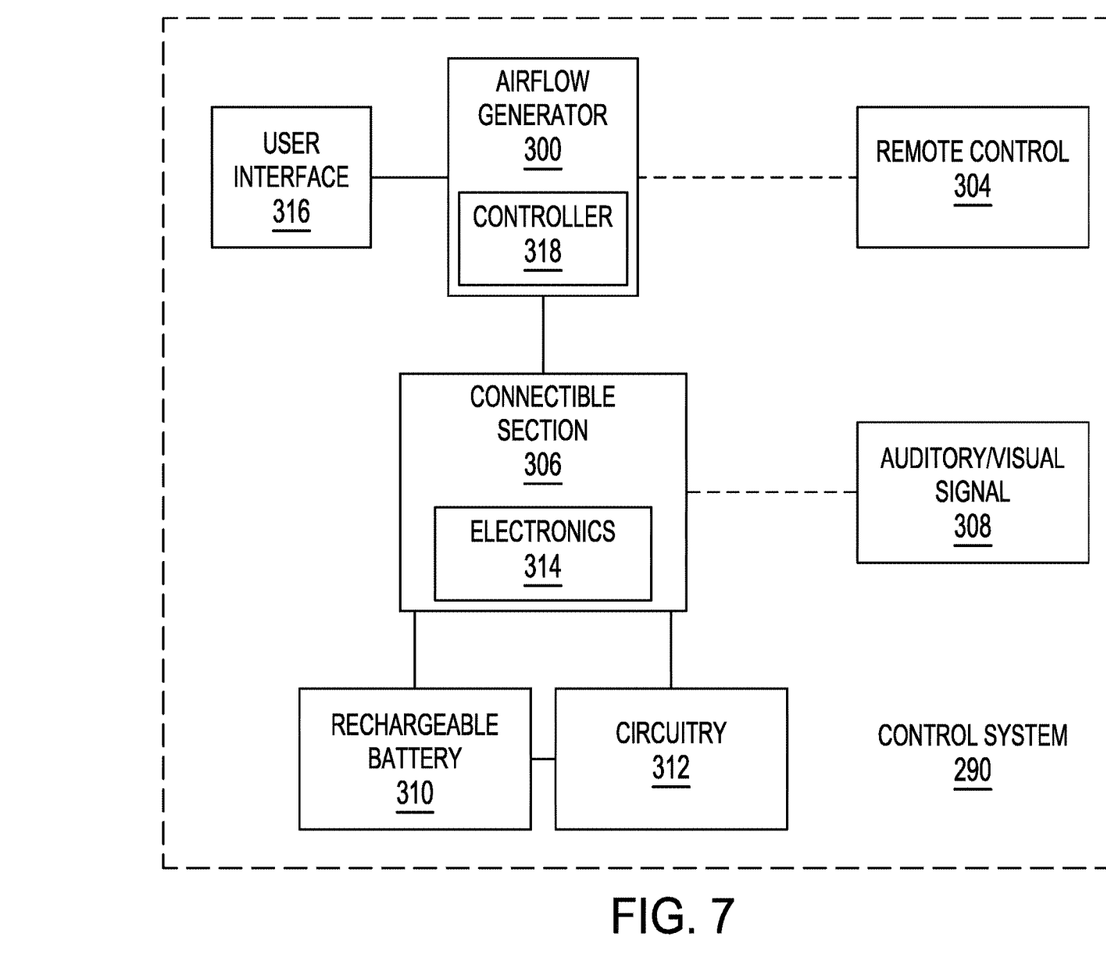
FIG. 7 shows an exemplary control system for the air driven toy building set of FIG. 1.

FIG. 7 shows an exemplary control system 290 for an airflow generator 300. A remote control 304 may be provided to operate the airflow generator 300. The one or more connectible sections 306 may be configured to output an auditory or visual signal 308 as previously described. The connectible section 306 may be powered by a rechargeable battery 310. Any suitable rechargeable battery may be used.

In exemplary embodiments, circuitry 312 may be connected between the connectible section 306 and the rechargeable battery 310. In exemplary embodiments, the circuitry 312 may be configured to transfer energy from the fluid flow to the rechargeable battery 310 configured to power electronics 314 associated with the at least one connectible section 306. In other exemplary embodiments, the circuitry 312 may be configured to transfer solar energy to the rechargeable battery 310 configured to power electronics 314 associated with the at least one connectible section.

A user interface 316 may be arranged on the airflow generator 300 or in connection with the airflow generator 300. The user interface 316 may be configured to receive a user input and communicate with a controller 318 for the airflow generator 300. The controller 318 may be configured to control the amount of air flow and/or a speed of the object, such that these parameters are variable via the controller 318. The remote control 304 may also communicate with the controller 318. A processor, memory, etc. may also be provided for the airflow generator 300, such that the user interface 316 may be used to select a pre-programmed sequence for the object.

It should be appreciated that many of the elements discussed in this specification may be implemented in a hardware circuit(s), a processor executing software code or instructions which are encoded within computer readable media accessible to the processor, or a combination of a hardware circuit(s) and a processor or control block of an integrated circuit executing machine readable code encoded within a computer readable media. As such, the term circuit, module, server, application, or other equivalent description of an element as used throughout this specification is, unless otherwise indicated, intended to encompass a hardware circuit (whether discrete elements or an integrated circuit block), a processor or control block executing code encoded in a computer readable media, or a combination of a hardware circuit(s) and a processor and/or control block executing such code.

All ranges and ratio limits disclosed in the specification and claims may be combined in any manner. Unless specifically stated otherwise, references to "a," "an," and/or "the" may include one or more than one, and that reference to an item in the singular may also include the item in the plural.

Although the disclosure shows and describes certain embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the disclosure. In addition, while a particular feature of the disclosure may have been described above with respect to only one or more of several illustrated embodiments, such feature may be combined with one or more other features of the other embodiments, as may be desired and advantageous for any given or particular application.

The invention claimed is:

1. An air driven toy comprising:
an air flow generator, wherein the air flow generator includes a housing in which air flow is generated to provide a flow of fluid, the housing defining an inlet sized to receive an object, an inlet duct, and an outlet through which the object exits the housing, and contained within the housing are:
a fluid flow generating device having an input coupled with the inlet duct and an output,
a main tube having a first end coupled with the output of the fluid flow generating device and a second end coupled with the outlet of the housing;
a branch tube having a first end coupled with the inlet sized to receive an object and a second end coupled with the main tube to form a junction.

2. The air driven toy according to claim 1 the fluid flow generating device further comprising a high static pressure fan arranged in the housing.

3. The air driven toy according to claim 1, wherein the air flow generator is configured to generate suction in the housing and draw the object into the least one passage.

4. The air driven toy according to claim 1 further comprising at least one connectible section that is removably couplable between the outlet of the air flow generator and the launch section for receiving the object from the air flow generator, the at least one connectible section defining at least one path for fluid flow through the at least one connectible section, wherein the air flow generator is configured to cause the object to be propelled through the at least one connectible section.

5. The air driven toy according to claim 4, wherein the at least one connectible section includes a plurality of connectible sections that are removably couplable to each other.

6. The air driven toy according to claim 5, wherein the plurality of connectible sections includes at least two tubular members that have at least one of a different diameter, a different length, or a different shape.

7. The air driven toy according to claim 6, wherein the at least two tubular members includes at least one straight tubular member defining a linear path for fluid flow.

8. The air driven toy according to claim 6, wherein the at least two tubular members includes at least one serpentine tubular member defining a non-linear path for fluid flow.

9. The air driven toy according to claim 4, wherein the at least one connectible section includes an air flow reducer configured to decrease a diameter of the at least one connectible section, and/or an expander configured to increase the diameter of the at least one connectible section for changing air flow through the at least one connectible section.

10. The air driven toy according to claim 4, wherein the at least one connectible section defines more than one path for the object through the at least one connectible section.

11. The air driven toy according to claim 4, wherein the at least one connectible section includes a connectible section configured to generate an auditory signal in response to the object and/or fluid flow passing through the connectible section.

12. The air driven toy according to claim 4 further comprising circuitry to transfer energy from the fluid flow to a rechargeable battery configured to power electronics associated with the at least one connectible section.

13. The air driven toy according to claim 4 further comprising circuitry to transfer solar energy to a rechargeable battery configured to power electronics associated with the at least one connectible section.

14. The air driven toy according to claim 4 further comprising a selector to cause the at least one connectible section to perform a desired function.

15. The air driven toy according to claim 4, further comprising:
the at least one connectible section further comprises a loop of wire and a light coupled with the loop of wire;
the object further comprises a magnet;
wherein when the object travels through the loop of wire a current is generated and causing the light to emit light.

16. The air driven toy according to claim 1 further comprising a remote control, wherein the air flow generator and/or the at least one connectible section is remotely controlled.

17. The air driven toy according to claim 1, wherein the outlet is arranged at an angle relative to the inlet.

18. The air driven toy according to claim 1, wherein the air flow generator includes a controller, wherein an amount of air flow and/or a speed of the object provided by the air flow generator is variable via the controller.

19. The air driven toy according to claim 1, wherein the junction is a wye junction and the angle between the where the second end of the branch tube intersects the main tube and the first end of the main tube is an acute angle.

20. An air driven toy comprising:
an air flow generator, wherein the air flow generator includes a housing in which air flow is generated to provide a flow of fluid, the housing defining an inlet sized to receive an object, an inlet duct, and an outlet through which the object exits the housing, and contained within the housing are:
a fluid flow generating device having an input coupled with the inlet duct and an output,
a main tube having a first end coupled with the output of the fluid flow generating device and a second end coupled with the outlet of the housing;
a branch tube having a first end coupled with the inlet sized to receive an object and a second end coupled with the main tube to form a wye junction having an acute angle;
a launch section removably fluidly coupled to the outlet of the air flow generator—and configured to launch the object into the air via the flow of fluid, the launch section defining a first opening removably couplable to the outlet of the air flow generator and a second opening terminating in open air and unconnected to any other component such that an object propelled through the launch section is launched into the air; and
at least one connectible section that is removably coupled between the air flow generator and the launch section for receiving the object from the air flow generator, the at least one connectible section defining at least one path for fluid flow through the at least one connectible section, wherein the air flow generator is configured to cause the object to be propelled through the at least one connectible section,
wherein the air flow generator further comprises a battery disposed in the housing and configured to provide power to the air flow generator.

* * * * *